June 5, 1951 H. E. KREFFT 2,555,749
FLUORESCENT LAMP
Filed Dec. 11, 1948 2 Sheets-Sheet 1
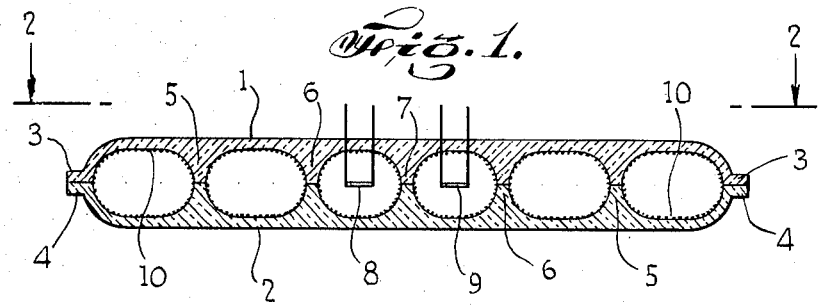
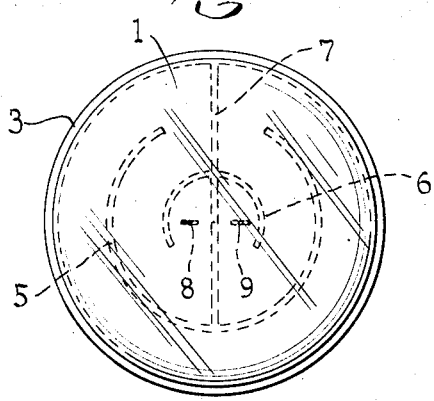
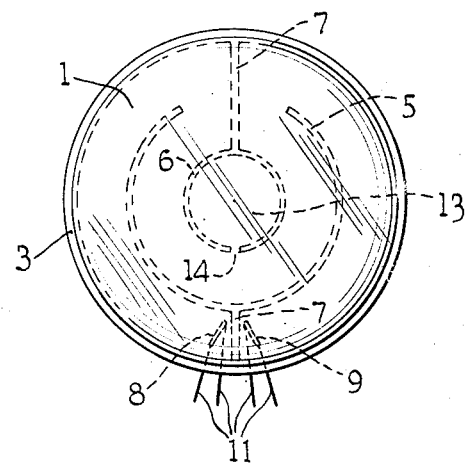
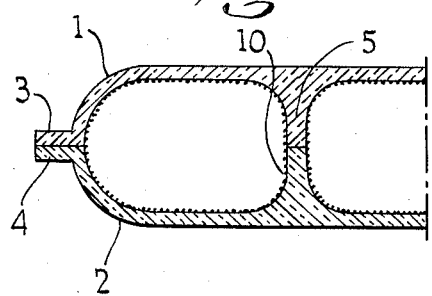
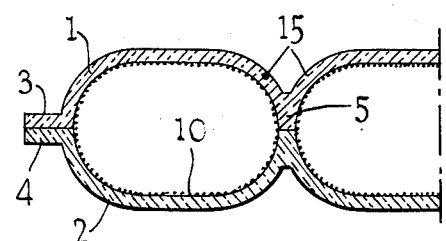
INVENTOR.
HERMANN EDUARD KREFFT
BY
ATTORNEY June 5, 1951 H. E. KREFFT 2,555,749
FLUORESCENT LAMP
Filed Dec. 11, 1948 2 Sheets-Sheet 2
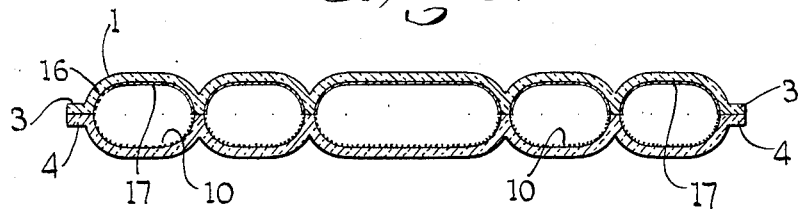
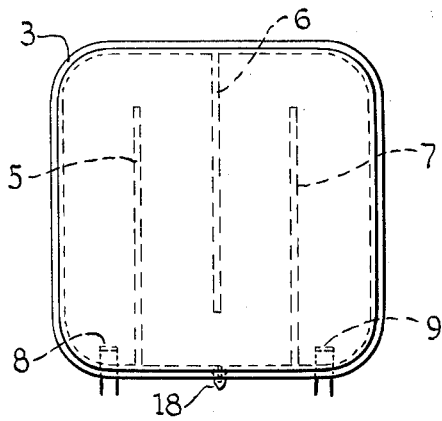
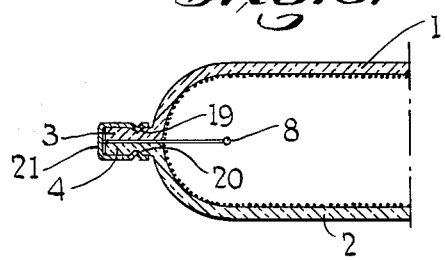
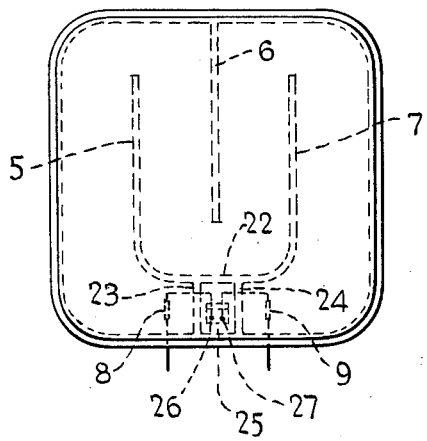
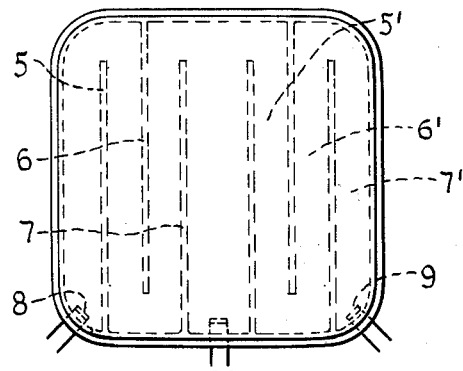
INVENTOR.
HERMANN EDUARD KREFFT
BY
ATTORNEY Patented June 5, 1951

2,555,749

UNITED STATES PATENT OFFICE 2,555,749

FLUORESCENT LAMP

Hermann Eduard Krefft,
Buenos Aires, Argentina

Application December 11, 1948, Serial No. 64,869
In Switzerland December 17, 1947

4 Claims. (Cl. 313—109)

The present invention relates to fluorescent lamps and more particularly to electrical discharge lamps for transforming ultraviolet radiations, produced by a low pressure discharge in a metal vapor, into light.

Since their first appearance, fluorescent lamps have found an immense field, as they offer extraordinary advantages compared with other electrical sources of light, due to their high luminous efficiency, unlimited possibilities of color, composition of radiation, and simple operating conditions. They usually consist of a straight glass tube, the inner surface of which is covered with a luminescent layer and the ends of which are supplied with activated solid incandescent electrodes and with bases.

This construction of the customary fluorescent lamps has various disadvantages which become obvious both during manufacture of these lamps and when they are used for illuminating purposes. Their large size causes difficulties of production, transport, and mounting in fixtures. A lengthy tube can be provided with the luminescent material only by means of the troublesome nitrocellulose method where the material is applied as a liquid dispersion. Once standardized, the length of these lamps, which are provided with a stem and a base on each end, has to be left unchanged on account of dimensions of the fixtures, which, for any further development of the lamps, means quite a handicap. The length of these lamps has to be reproduced with a very small allowance only. The tube of the lamp must be straight and round and must have a uniform wall and diameter. Owing to these numerous conditions a rather high breakage cannot be avoided during manufacture. On the other hand, illuminating engineers ask for a more compact design of the lamp, which has resulted in the manufacture of circular lamps the production of which, however, is not satisfactory.

It is an object of the present invention to provide fluorescent lamps which are suited for production on a large scale with minimum breakage. It is another object of the present invention to provide fluorescent lamps having a substantially low voltage drop in comparison with line voltage. It is a further object of this invention to provide fluorescent lamps which decrease the harmful influence of temperature on the light emmission of a luminescent material. It is a still further object of the present invention to provide a fluorescent lamp and novel base therefor. Other objects and advantages of the present invention will become apparent from the description hereinafter following and the drawings forming part hereof, in which:

Figure 1 is a diagrammatic representation of a cross sectional view of a lamp according to the invention, Figure 2 is a diagrammatic representation of a top view of Figure 1 along the lines 2—2, Figure 3 is a diagrammatic representation of a modification of the fluorescent lamp of the invention, Figure 4 is a diagrammatic representation of an enlarged view of an embodiment of the invention, Figure 5 illustrates a modification of Figure 4, Figure 6 is a diagrammatic representation of another modification of the invention, Figure 7 illustrates another form of the fluorescent lamp of the invention, Figure 8 illustrates an enlarged vertical section of that portion of a lamp which is provided with a contact, Figure 9 illustrates a fluorescent lamp according to the invention showing an electrode heating device contained therein, and Figure 10 illustrates a fluorescent lamp according to the invention provided with two discharge paths.

According to the present invention, there is provided a compact and plane source of light which is suited for production on a large scale and does not have the disadvantages referred to above. The discharge vessel of the new lamp is composed of two molded glass sections which are supplied with intermediate or separating walls subdividing the space enclosed by the sections in such a way that a repeatedly bent discharge path, uniformly occupying this space, is produced. The length of such discharge path is several times larger than the dimensions of the sections. The cross-section of the discharge path relates to the length in such a way that the voltage drop of the discharge path amounts to about one half the usual line voltage. The invention results, among other advantages, in a decrease of the harmful influence which temperature has on the light emission of the luminescent material, in a favorable photometric curve of the lamp, and in a simplified circuit for the lamp. Furthermore, the invention provides a new method for providing the lamp with a base, a lamp with two discharges and improved modulation of the light emitted, and the use of organic glasses for the construction of the lamp container.

Discharge lamps, the container or envelope of which is composed of molded glass parts, are not new in a general way. For instance, it has been suggested to construct in this way quartz lamps which are operated under high vapor pressure. It has been suggested also to make luminous signs, as for instance letters for neon lights, according to this method in order to avoid the difficult process of bending of glass tubes. It has been suggested, also, to produce discharge containers or envelopes formed like bricks, and to use a large number of these elements in order to build up a luminous wall. The object of such inventions, however, is not for an efficient fluorescent lamp suited for general illumination with an emission of light uniformly distributed over a plane surface, which satisfies the needs of modern illumination, and which can be used in large numbers.

The construction of the discharge envelope by means of two molded glass sections, at least one of which is partitioned, offers the great advantage that these parts can be made in large quantities and with exact dimensions, and that storage, handling during manufacture and transport, do not create such difficulties as are connected with usual tubular lamps. The exact length and the accurate sealing of two stems are not required. The luminescent material can be deposited as dry powder on the surface of the sections which are wetted with a suitable binding material before they are fused together to form a container. Compared with the method usually used for tubes employing a dispersion of the material in a mixture of nitrocellulose with acetone or amylacetate, the essential improvement is that these materials, which are harmful for the light maintenance of the lamp, are avoided and that a more efficient heat treatment of the luminescent layer is made possible. An internal reflecting surface which is desirable in some cases can be easily made in the new lamp, while in the usual tubes it is practically impossible to apply. Other advantages and properties of the new lamp, as for instance the incorporation within the lamp container of the starting switch required for heating the electrodes previous to starting, will be explained later. The flat structure of the new lamp is of particular value for the uses in illumination and agrees with the needs of illuminating engineers requesting a more compact source of light in every respect. A number of lamps can be easily composed to form a larger luminous area supplying the required luminous flux, which offers to makers of fixtures many new possibilities for decorative effects and an improved illumination.

The fundamental construction of a lamp made according to the invention is shown in Figures 1 and 2.

According to Figure 1, the lamp of the present invention is shown in cross-section. The discharge container comprises two plate-like sections 1 and 2 of which the rims 3 and 4 are fused together directly or by means of a glass enamel. The flat space enclosed by the sections is subdivided by intermediate walls 5, 6 and 7. Near the center of the sections, incandescent electrodes 8 and 9 are arranged which consist preferably of tungsten coils activated with the oxides of alkaline earths. Leading-in conductors sealed into the section 1 carry the electrodes and communicate electrical connections with the lamp base. As indicated in Figure 2, which shows a top view in the plane of symmetry between the rims, the sections are circular and the walls 5 and 6 form concentric open rings, while 7 is a straight partition. By the use of intermediate walls or partitions, which are produced simultaneously, at least on one section, while the sections are molded, and which may form an integral part of the sections, the space enclosed by the sections is subdivided in such a way that a tortuous discharge path is formed between the electrodes 8 and 9, and which is formed in the shape of two concentric circles, the length of which amounts to a multiple of the diameter or total dimensions of the lamp container. The height of the intermediate walls is such that closed discharge channels are formed when the rims 3 and 4 of the sections are put together and no short circuits between adjacent parts of the discharge path can occur. The inner surfaces of the sections are coated with a layer 10 of luminescent materials which is preferably composed of a mixture of luminescent silicates, borates and tungstates. The discharge container, after the rims of the sections are fused together, is carefully evacuated through an exhaust tube and is filled with a rare gas under low pressure together with a small quantity of mercury.

During manufacture of the lamp, the sections are sprayed with a suitable binding material, for instance a solution of phosphoric acid in acetone, and the dry mixture of fluorescent materials of small grain size is then deposited on the surface thus prepared. This layer is then dried by baking. After the electrodes are mounted, the sections are tightly fused together at the rims, which is preferably done by means of a glass enamel. The discharge container thus formed is evacuated and baked in the usual way and the electrodes are heated to incandescence. Finally, the lamp is filled with a rare gas, for instance argon of 10 to 20 millimeters pressure, and a quantity of vaporizable metal, e. g. mercury, sufficient for the production and maintenance of a low pressure mercury discharge.

Fluorescent lamps for usual line voltages, as it is known, are mostly supplied with pre-heated electrodes because starting is easily performed with hot electrodes. The new lamps are, therefore, also supplied with two leading-in wires for each electrode so that these can be put in series in the usual way with each other and with the ballast of the circuit by means of a switch. When this switch, which is mostly thermically operated by a glow-discharge, is opened, an additional voltage is produced which starts the discharge between the electrodes. In this way, it is possible to adjust the length of the discharge path to its cross-section area in such a proportion that the voltage drop between the electrodes amounts to fifty percent of the line voltage when the lamp is under operation. Similar operating data are obtained for the new lamps by suitable dimensions of the length and the cross-section of the discharge path which can be found easily by experiment. In the case of a 40-watt lamp constructed as shown in Figures 1 and 2, one which is constructed for an A. C. line voltage of 220 volts, the molded sections of the container have a diameter of 25 centimeters without the rims and the internal distance between the sections amounts to 25 millimeters. The intermediate partitions are arranged in such a way that a uniform discharge path with a cross-section of 25 by 40 millimeters and a length of about 100 centimeters is formed. For the surface of the lamp having the dimensions above stated, and the current density of the discharge, assuming uniform distribution over the cross-section, amounts to about 45 milliamperes per square centimeter. At these values, the radiant efficiency of the discharge in the ultraviolet range and the luminous efficiency of transformation of this radiation through the luminescent materials, are sufficiently good as current density and temperature are within reasonable limits.

From the viewpoint of the manufacturers of fixtures, it is not always desirable to have the electrodes and the base of the lamp arranged near the center of the lamp. Therefore, in the example of a circular lamp shown in Figure 3, the electrodes 8 and 9 are arranged near the periphery of the discharge container and the leading-in conductors or wires 11 are sealed between the rims of the sections. Owing to this new arrangement of the electrodes, the intermediate walls 5, 6 and 7 are arranged in a different way than in the case of the lamp shown in Figure 2, but the discharge path of the new lamp also essentially consists of two circular concentric channels. A small space 13 lying in the center of the lamp is not occupied by the discharge, but it is preferably connected with the other parts of the lamp volume by means of an opening 14 contained in the wall 6 in order to facilitate evacuation of this space. The leading-in wires of the electrodes are preferably contained in slots which are pressed into the rims in convenient places. In the case of this construction of the lamp, the contacts of the lamp base are fastened to the rims, for instance by pressing U-shaped sheets onto the rims which have corresponding grooves.

Since for the dimensions of fluorescent lamps the susceptibility of luminescent materials to temperature is the governing principle, the discharge container of the new lamps has a comparatively flat shape so that more than half, preferably more than two thirds to three quarters of the luminescent layer, are deposited on walls which are in direct contact with the enclosed or surrounding atmosphere, and the external surface area of which may be increased by grooves. This part of the luminescent layer, therefore, is little heated, and the light emitted by it, when not directed towards the interior of the lamp, can leave the lamp container on the shortest way possible. The luminescent material deposited on an intermediate internal wall, however, must become hotter, as heat conduction to the surrounding atmosphere is less good for these parts, as Figure 4 obviously shows. The partition 5 shown here is heated up on both sides. Figure 4 shows in full scale a periphic part of a section cut at right angles to the plane of the container. As in Figure 1, the container consists of the molded sections 1 and 2 which are joined together with the rims 3 and 4. Figure 4 shows the discharge path next to the periphery, which is limited on the other side by the partition 5, and a part of the adjoining path situated more to the center of the lamp. The luminous efficiency of transformation of the radiation by the part of the luminescent layer 10 which is deposited on the wall 5 is lower than for other parts owing to the higher temperature, and additional light is lost on the long way the light produced at 5 has to travel before leaving the lamp. In order to reduce these losses the sections are preferably shaped in the way indicated in Figure 5 where the surface of the intermediate walls is essentially reduced by grooves 15, and in this way the share of the wall area which is in direct contact with the surrounding atmosphere is increased to more than seventy-five percent to nearly ninety percent of the area covered with luminescent materials. Except for this particular shape of the sections, Figure 5 corresponds to Figure 4 with respect to the object shown and the details indicated.

In such cases where the lamps are operated in a horizontal position, however, it cannot be avoided that the luminescent materials deposited on the upper section, in a way common to all discharge lamps, is heated up more intensively than the material on the other section by convection of the heated gases and vapors of the discharge. As the luminous efficiency of the lamp is reduced by this unavoidable effect, parts of the container wall, which become hotter, are preferably not coated with luminescent materials but supplied with a layer having good reflecting properties for light and ultraviolet radiation. Such layer may consist of magnesium oxide or a metal of high reflectance like aluminum which, in a manner already known, is deposited under vacuum by evaporation. An example of such a fluorescent lamp with internal reflector is contained in Figure 6, which shows the same section as in Figures 4 and 5 of a lamp constructed according to Figure 3. The details indicated by numbers are identical with those of the other figures. In the case of Figure 6, the entire upper section 1, with the exception of a strip 16 lying next to the periphery of the lamp, is coated with a reflecting layer 17 which throws light and ultraviolet radiation of the discharge, and the light emitted internally by the fluorescent layer 10, onto this layer. A reflector lamp of this type does not require fixtures supplied with reflectors, furthermore, the poor maintenance caused by dust collecting on the lamp is improved as the parts of the lamp likely to become dusty are not to transmit light. Besides, through this coating of the lamp with a reflecting material, the effect of temperature on the emission of the luminescent material is reduced relatively, if the total transformed radiant energy is considered, as a portion of the thermal energy produced in the discharge is transported through the reflecting walls and thus does not contribute to the heating of the luminescent material. On the other hand, this layer has to transform a larger amount of radiation, in comparison with a lamp which has no reflector, as long as the dimensions of the lamp are not changed. In this way, the thermal energy produced in the luminescent layer is increased owing to energy losses connected with the process of transformation. However, the surface brightness of the lamp is superior. If in this way, the luminescent material is exposed to an undesirable temperature, the conditions of the lamp containing no reflector may be reproduced by a slight increase in dimensions of the lamp, but there will be still a further increase in surface brightness.

For the use of a larger number of lamps in a fixture, sometimes a square shape of the lamp is desirable. A construction of this kind is shown in Figure 7. The molded section shown here, for glass technological reasons, has round corners and it is supplied with the rim 3 and the partitions 5, 6 and 7 which, in this case, are straight. The leading-in wires of the electrodes 8 and 9 are sealed in a manner already described. The exhaust tube 18 also is preferably arranged between the rims of the sections. After fusing of the rims and evacuation of the lamp, the rims, in those places where the leading-in wires are sealed, are supplied with contacts in a manner already described and which consist of U-shaped metal sheets pressed around the rims. As indicated in Figure 8, where a vertical section of the lamp passing through one of the leading-in wires of electrode 8 is shown, the rims 3 and 4 of the sections 1 and 2 are provided with grooves 19 and 20 into which the sheet of the contacts 21 is pressed. Corresponding to the four leading-in wires, the lamp has four such contacts. For the support of the lamp in a frame serving as a lamp holder, which is not shown here, the entire edge of the lamp is preferably supplied with this sheet. When the lamp is to be installed in the fixture, it is slid into such a frame which possesses contacts corresponding to the contacts of the lamp, through which the lamp is connected to the circuit. As the fixture, according to the luminous flux required, may consist of a larger number of such frames, luminous surfaces of large extent may be composed which are subdivided by only the narrow frames holding the lamps.

In accordance with the novel lamp herein described, it becomes possible to incorporate a starting switch, e. g., a glow switch required for preheating of the electrodes for starting a main discharge, within the discharge container and in this way the circuit for the lamp is greatly simplified. As shown in the example of Figure 9, the electrodes 8 and 9 are arranged closer to each other than in case of Figure 7 and the partitions 5 and 7 are connected to each other by a new intermediate wall 22 which, with the partitions 23 and 24 and the rim of the lamp, forms a chamber. In this chamber, the starting switch 25 is contained and is operated through the thermal effect of a glow discharge produced between the switch electrodes, i. e. starting electrodes 26 and 27. The electrical connection between these electrodes and the electrodes 8 and 9 passes through slots which are pressed in the partitions 23 and 24. When the switch is arranged in this way only one leading-in wire for each electrode 8 and 9 is required, which means a considerably simplification both for the lamp base and for the lamp holder and the circuit.

The operation of these lamps with alternating current of the usual frequency causes, as with all discharge lamps, a modulation of the emitted light which is compensated, as it is known, by utilizing a pair of lamps with currents having different phase displacement. For example, the pair of lamps are connected to a three phase line to produce the phase displacement desired. The construction of the new lamps, made according to the invention, offers special advantages for such an arrangement as two discharge paths may be contained in the space enclosed by the sections, which, preferably, have one common electrode. The example of a 40 watt lamp shown in Figure 10, which consists of two discharge path systems dimensioned for 20 watts each, provides for an electrode arrangement where all the leading-in wires are sealed on the same side of the discharge container. The section shown here has partitions 5, 6 and 7 which enclose one discharge path and partitions 5', 6' and 7' which enclose the other discharge path. The discharge container is provided with the electrode 28 which serves for both discharges, and the electrodes 8 and 9 serving separately as electrodes for the two discharges.

It is within the scope of the invention to form the discharge container into various flat shapes, e. g. substantially flat and circular or rectangular, etc., as long as the discharge path, formed by the inner partitions or walls herein set forth, is maintained in accordance with the relationship between cross-sectional area and length as described.

What I claim is:

1. A low pressure gaseous discharge lamp comprising in combination, a flat-shaped envelope formed of two plate-like molded glass sections sealed together at the rims thereof to form a discharge chamber for containing a mixture of metal vapor and a rare gas, spaced electrodes in said chamber for maintaining a gaseous discharge, partitions in said discharge chamber spaced to provide at least one uniform and closed tortuous discharge path between the electrodes, said uniform discharge path being operable to provide a uniform current for uniform distribution of light emission, a coating of fluorescent material on the walls of said envelope, lead-in conductors to said electrodes sealed between the rims of said envelope, sheet contacts electrically connected to said conductors and secured over the rims of both of said plates.

2. A low pressure gaseous discharge lamp comprising in combination a flat-shaped envelope formed of two plate-like molded glass sections sealed together at the rims thereof to form a discharge chamber for containing a mixture of metal vapor and a rare gas, spaced electrodes in said chamber for maintaining a gaseous discharge, partitions in said discharge chamber spaced to provide at least one uniform and closed tortuous discharge path between the electrodes, said uniform discharge path being operable to provide a uniform current for uniform distribution of light emission, a coating of fluorescent material on the walls of said envelope, lead-in conductors to said electrodes sealed between the rims of said envelope, sheet contacts electrically connected to said conductors and secured over the rims of both of said plates, a layer of reflecting material on a surface of one of said plate-like envelope sections.

3. A low pressure gaseous discharge lamp according to claim 1 comprising two discharge paths formed by said partitions, three electrodes of which one electrode is a common electrode for both discharge paths.

4. A low pressure gaseous discharge lamp according to claim 1 comprising, wherein said contacts are of U-shape.

HERMANN EDUARD KREFFT.

REFERENCES CITED

The following references are of record in the file of this patent:

UNITED STATES PATENTS

| Number | Name | Date |
|---|---|---|
| 2,009,215 | Abshagen | July 23, 1935 |
| 2,255,431 | Marden | Sept. 9, 1941 |
| 2,295,043 | Lompe | Sept. 8, 1942 |
| 2,317,265 | Foerste | Apr. 20, 1943 |
| 2,349,360 | Marden | May 23, 1944 |
| 2,364,889 | Blair | Dec. 12, 1944 |
| 2,405,518 | Polevitzky | Aug. 6, 1946 |
| 2,408,822 | Tanis | Oct. 8, 1946 |
| 2,451,043 | Pennybacker | Oct. 12, 1948 |